United States Patent
Farouki et al.

(10) Patent No.: US 7,937,476 B2
(45) Date of Patent: May 3, 2011

(54) METHODS AND SYSTEMS FOR AUTO-SENSING INTERNET ACCELERATORS AND PROXIES FOR DOWNLOAD CONTENT

(75) Inventors: Karim M. T. Farouki, Seattle, WA (US); Yevgeny Zarakhovsky, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1177 days.

(21) Appl. No.: 11/101,947

(22) Filed: Apr. 8, 2005

(65) Prior Publication Data

US 2006/0230127 A1    Oct. 12, 2006

(51) Int. Cl.
*G06F 15/173* (2006.01)
*G06F 15/16* (2006.01)

(52) U.S. Cl. ......... 709/227; 709/223; 709/224; 709/228

(58) Field of Classification Search .................. 709/217, 709/219, 223, 225, 231, 224, 227, 228; 714/2, 714/4

See application file for complete search history.

(56) References Cited

U.S. PATENT DOCUMENTS

| | | | | |
|---|---|---|---|---|
| 5,938,723 | A * | 8/1999 | Hales et al. | 709/204 |
| 6,161,137 | A * | 12/2000 | Ogdon et al. | 709/224 |
| 6,345,294 | B1 * | 2/2002 | O'Toole et al. | 709/222 |
| 6,449,658 | B1 * | 9/2002 | Lafe et al. | 709/247 |
| 6,754,700 | B1 * | 6/2004 | Gordon et al. | 709/219 |
| 6,757,723 | B1 * | 6/2004 | O'Toole et al. | 709/222 |
| 7,007,090 | B1 * | 2/2006 | Spangler et al. | 709/226 |
| 2003/0023745 | A1 * | 1/2003 | Noe | 709/235 |
| 2004/0003266 | A1 * | 1/2004 | Moshir et al. | 713/191 |
| 2004/0205165 | A1 * | 10/2004 | Melamed et al. | 709/219 |
| 2006/0230127 | A1 * | 10/2006 | Farouki et al. | 709/223 |

FOREIGN PATENT DOCUMENTS

WO    WO 02/101570    * 12/2002

OTHER PUBLICATIONS

A. DeSchon, R. Braden, Background File Transfer Program [Online], Aug. 1998, whole document, [retrieved on Aug. 5, 2010], Retrieved from the internet: <URL:http://tools.ietf.org/html/rfc1068>.*

* cited by examiner

*Primary Examiner* — Kevin Bates
*Assistant Examiner* — Mohammed Ahmed
(74) *Attorney, Agent, or Firm* — Shook, Hardy & Bacon L.L.P.

(57) ABSTRACT

The present invention allows for the downloading of content regardless of a computing device's configuration. Computer software is executed on the computing device to accommodate multiple download protocols and techniques. The present invention also works through problems associated with proxies, firewalls, and internet accelerators to download content from the internet.

12 Claims, 6 Drawing Sheets

METHODS AND SYSTEMS FOR AUTO-SENSING INTERNET ACCELERATORS AND PROXIES FOR DOWNLOAD CONTENT

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of computer software including download managers, operating systems, proxies and firewalls, internet accelerators, and web browsers.

BACKGROUND OF THE INVENTION

When offering a software service that allows for the downloading of content, it is important to service a customer base that includes both customers in their corporate environment as well as home users who are still using dial-up internet connections connected to the internet by internet accelerators. In many cases, corporate environments are protected by a proxy service. Some download managers may not work if internet protocol requests are not redirected. Furthermore, some internet accelerators fail to honor HTTP GET requests that ask for the content size causing the download manager to fail.

Corporate environments are becoming increasingly concerned with their employees using network bandwidth for content downloads that may hamper an information technology (IT) department's ability to deploy security fixes, hot fixes, and the like. IT departments depend on the WINDOWS® Background Intelligent Transfer System (BITS) developed by the MICROSOFT CORPORATION of Redmond, Washington to control software deployment activities. BITS is the mechanism by which the WINDOWS® Operating System, also developed by the MICROSOFT CORPORATION of Redmond, Washington, provides computer software updates to publish security patches, hot fixes, etc. BITS is not perfect and may not work in the presence of some proxy servers unless a client's internet settings are configured in a particular way.

With internet accelerators, a download program or download manager may not operate correctly because the information that is required to enable the download is not available. Internet accelerators are known to strip away data that is required by a download program, not for any purposeful intent but because the data is viewed by the computer software as being not necessary. The internet accelerator strips this data to speed up the internet transfer. For example, a download manager may need the content size of a file in order to determine how much information may be downloaded from the internet. Unfortunately, the internet accelerator strips away information providing the content size in the file because it is deemed non-critical to the acceleration process. Therefore, if a download manager cannot recognize the content size for a particular file, the download process may fail. From the perspective of an internet accelerator, the internet accelerator's job is to strip away non-essential information before providing information to the user. For the download manager, certain information is required in order to enable the download process to work and if that information is considered non-essential, then the download process will not work.

BRIEF SUMMARY OF THE INVENTION

The present invention allows for the successful download of content despite the use of internet accelerators that strip away required data for downloads, or the use of a proxy service that may not reroute internet protocol requests, thus, causing a failure with a download manager. This disclosure describes, among other things, methods and systems for auto-sensing internet accelerators and proxies for download content.

A method for transferring content in a network is implemented that includes detecting a background intelligent transfer service executing in an operating system on a computing device. A proxy name from a registry is bound to a job associated with the background intelligent transfer service. The background intelligent transfer service operates to transfer content between the computing device and other computing devices.

Another method is also provided for transferring content in a network. The method includes detecting an internet accelerator operating on a computing device. A background intelligent transfer service is operated to transfer content between the computing device and other computing devices. Upon a failure of the background intelligent transfer service during the transfer of content, an application program interface and an application-level protocol are selected to transfer the same content between the computing device and other computing devices.

A method is also provided for managing downloads from the internet. The method includes detecting a dial-up internet accelerator on a computing device. At the computing device, an HTTP GET request is executed and a determination made if the HTTP GET request is successful. If unsuccessful, an application program interface and an application-level protocol are executed to download content from the internet and to bypass using a background intelligent transfer service.

BRIEF DESCRIPTION OF THE SEVERAL VIEWS OF THE DRAWINGS

The present invention is described in detail below with reference to the attached drawing figures, which are incorporated herein by reference, and wherein.

DETAILED DESCRIPTION OF THE INVENTION

The present invention will be better understood from the detailed description provided below and from the accompanying drawings of various embodiments of the invention, which describe, for example, methods and systems for decreasing problems associated with downloading content from the internet. The detailed description and drawings, however, should not be read to limit the invention to the specific embodiments. Rather, these specifics are provided for explanatory purposes that help the invention to be better understood.

The present invention allows for the downloading of content regardless of a computing device's configuration. Computer software is executed on the computing device to accommodate multiple download protocols and techniques. The present invention works through problems associated with proxies, firewalls, and internet accelerators to download content from the internet.

Having briefly described an overview of the present invention, an exemplary operating environment for the present invention is described below.

Exemplary Operating Environment

Figure 1:
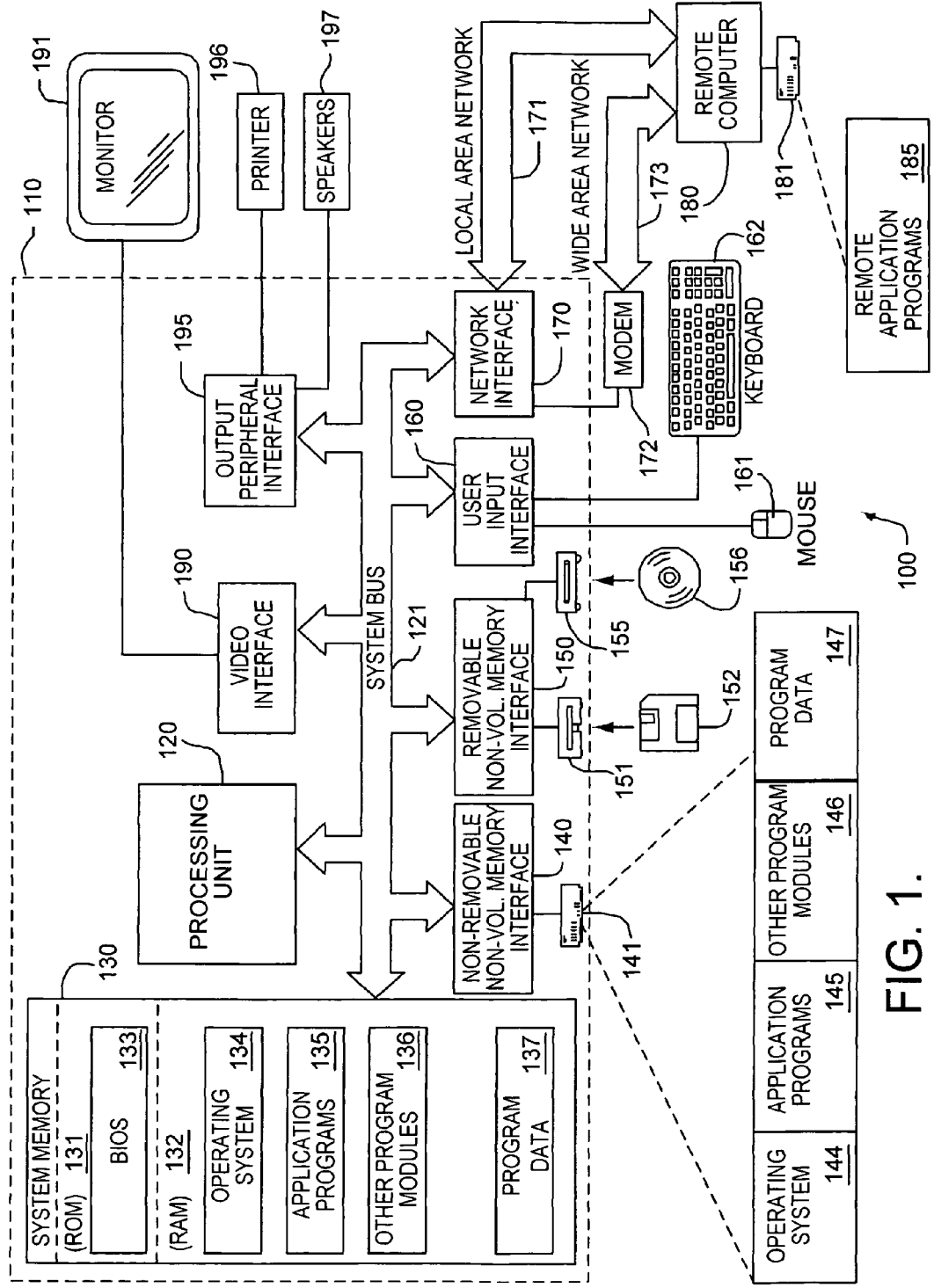
FIG. 1 is a block diagram of an exemplary operating environment suitable for practicing an embodiment of the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between the various steps herein disclosed unless and except when the order of individual steps is explicitly described.

Auto-Sensing Internet Accelerators and Proxies for Download Content

Figure 5:
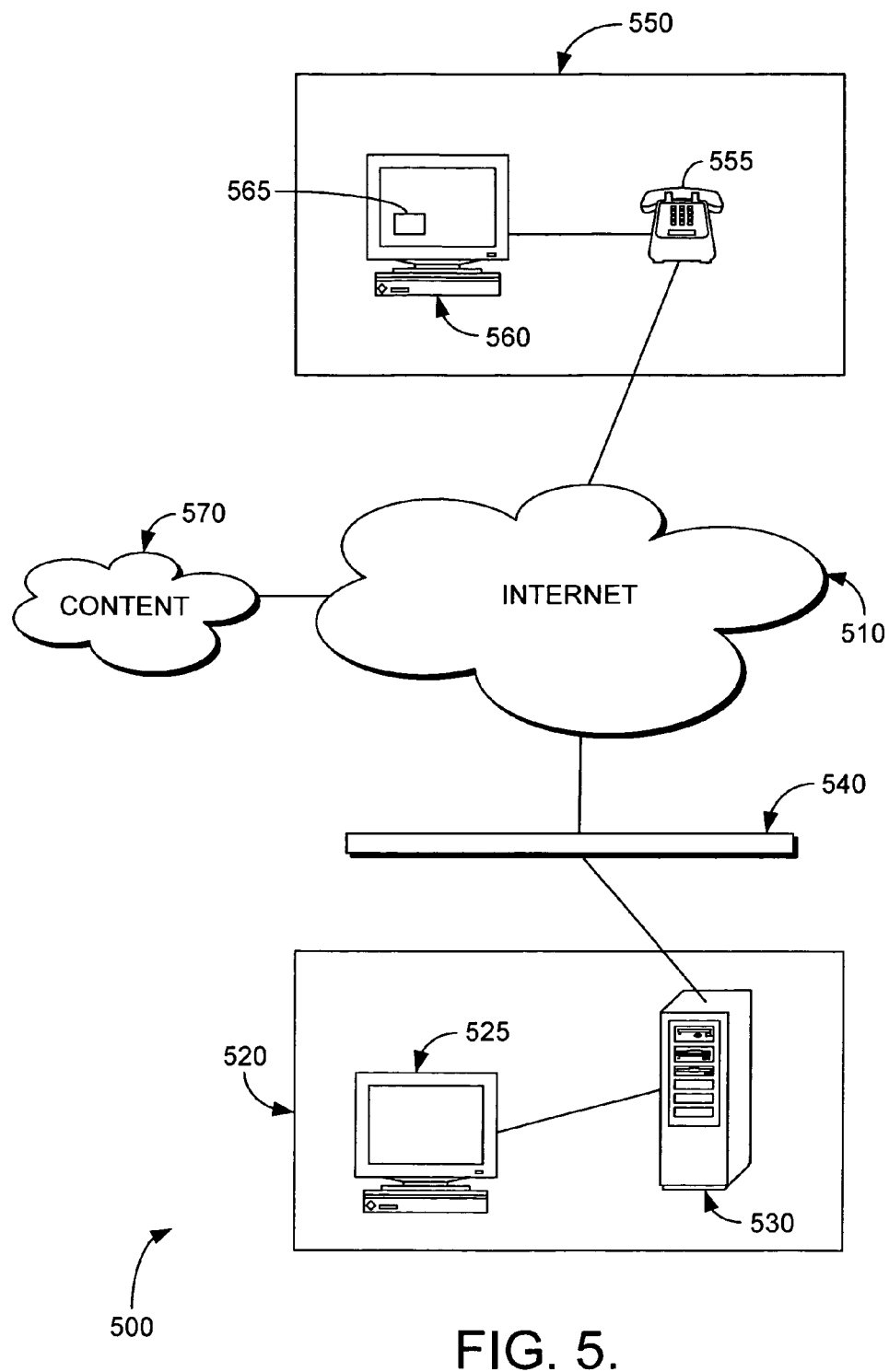
FIG. 5 is another block diagram of an exemplary operating environment suitable for practicing an embodiment of the present invention.

In FIG. 5, a block diagram of a suitable operating environment for practicing an embodiment of the present invention is shown in a network 500. Network 500 is shown with a corporate environment 520 connected to a firewall 540, a residential environment 550, an internet 510, and a content 570.

Corporate environment 520 is an illustration of a corporate environment which may contain many users. The illustration here shows corporate environment 520 as a depiction of a user 525 connected to a server 530. This configuration is representative of a typical corporate environment whereby many users represented by user 525 are connected to server 530. However, there may be many more users and servers in the business environment. The illustration here is only representative of the many types of configurations that may be deployed in corporate environment 520. User 525 may be able to access the internet if allowed by an information technology (IT) administrator. User 525 may access the internet by going through server 530, which has a connection to internet 510 through firewall 540. Most corporate environments have firewall 540 implemented as security to prevent unwanted information from entering into corporate environment 520. Firewall 540 is usually an integral part of corporate environment 520 and is controlled by an IT group or system administration group within corporate environment 520. In order to successfully have firewall 540 operate correctly, user 525 may have certain settings enabled to operate within firewall 540. The IT administrator may control the access of information between corporate environment 520 and internet 510 by setting computer software within server 530. For example, the IT administrator may execute firewall software at server 530 that controls the entire corporate environment. Therefore, all users that operate within corporate environment 520, like user 525, would have to go through server 530 in order to access internet 510. There are at least two types of configurations that may be implemented to allow user 525 to access internet 510. First, the IT administrator may install and set certain proxy client software at user 525 in order to enable the proxy client software to work with firewall 540. In this configuration, the firewall may be localized to user 525 rather than the complete corporate environment 520. Such software is normally referred to as a proxy/firewall client. Firewall 540 might secure user 525 but leave other users unsecured in this configuration. Or, other users -may -have their proxy client software installed with their own localized firewall (i.e. proxy firewall client). Secondly, proxy settings may be enabled in a web browser at user 525 to work with firewall 540. Proxy settings set the level of access that a computing device may have to internet 510. Proxy settings may prevent certain information from leaving the network of corporate environment 520. Conversely, proxy settings working with firewall 540 may prevent information from entering into the network of corporate environment 520 from internet 510. Proxy settings, enabled at user 525, work in conjunction with firewall 540 to provide a secure environment for the transfer of data within corporate environment 520 and beyond into internet 510. Firewall 540 establishes the boundary between corporate environment 520 and internet 510 in this configuration.

With either configuration for firewall 540, web browser proxy settings in user 525 or locally installed proxy/firewall client at user 525, both configurations limit access to internet 510. Based on the policies of the business entity, the IT administrator may determine the level of access that user 525 may have to internet 510. For example, the IT administrator may allow user 525 to have access to the internet for certain business purposes but may restrict that access for non-business purposes. Also, the IT administrator may control the flow of data between user 525 and the internet based on the size of that information. For example, the IT administrator may restrict certain transfers of files beyond a certain size. This may be done in order to prevent the network from becoming congested. The IT administrator is concerned with the operations of the corporate environment. If user 525 is allowed to transfer an extremely large file, this activity may impact the performance of the corporate network. The IT administrator can control network access to user 525 using firewall 540, either through using the proxy settings in user 525 or by using the locally installed proxy/firewall client at user 525.

User 525 may have access to internet 510 and may access content 570 as shown in FIG. 5. As stated earlier, content 570 may be restricted depending upon the policies implemented by corporate environment 520. Content 570 may be a file or it may be a stream of data. An example of content 570 may be a music file, with a file extension .AU or .WMA in the computer software environment. It may be a video file with extension .MOV or .MPG. Content 570 may be a picture as identified as a JPEG file or BITMAP file with the extension .JPG or .BMP. The idea here is to illustrate that content 570 is not restricted to any particular type of file or data. It may be any type of information that transfers between user 525, server 530, firewall 540, and internet 510.

With the concerns of the information flow from the corporate environment into the internet and reversed, user 525 or the IT administrator is concerned with the receipt of content 570 that is successfully delivered through the network down into the computer either at server 530 or at user 525. Because of the existence of firewall 540, there are times when content 570 may not successfully be transferred between the environment of internet 510 and corporate environment 520. As will be discussed below, sometimes information may inadvertently get blocked at firewall 540. However, an embodiment of the present invention discusses below how content 570 may be successfully transferred to user 525 despite the existence of a firewall or proxy.

Residential environment 550 may have the same access to internet 510 as corporate environment 520, but without the firewall. Residential environment 550 is shown with a computer 560 and telephone 555. The illustration in residential environment 550 is indicative of a dial-up internet connection. Computer 560 is connected to telephone 555 which is connected to internet 510. As discussed with user 525, computer 560 may access content 570 through internet 510 over the dial-up connection with telephone 555. A user implementing this configuration may experience a slow transfer of data because of the limited transmission speed over the dial-up connection. The dial-up internet connection may be very slow especially when downloading information such as content 570. The connection may be made even slower if there is congestion in internet 510. Some businesses have provided commercially available products to speed up internet connections for users with dial-up internet connections by offering a product called an internet accelerator. The internet accelerator product provides a way to increase the data speed for dial-up internet connections. A key aspect of internet accelerators is that they compress data or strip away data to reduce data size before it is downloaded to a computer such as computer 560. For example, if a user installs the internet accelerator on a computer, the internet accelerator controls how information or content is transferred between the computer and the internet. Therefore, in FIG. 5, a user would install internet accelerator 565 on computer 560 to access internet 510 with an internet service provider. The user would still use computer 560 in a dial-up internet session using telephone 555. Internet accelerator 565 would operate to reduce the amount of data actually transmitted to the computer, increasing the speed of the transfer. The full amount of data that is normally downloaded is now reduced to only that amount which is necessary before being downloaded to the computer. Likewise, internet accelerator 565 may put regularly accessed data into the computer's cache to reduce the download time. By caching information into memory, data will not have to be retrieved again at a later time. Caching provides the user the appearance of a faster internet connection. Unfortunately, caching of information and the reduction of data during a download leads to problems for users downloading content from internet 510.

Figure 2A:
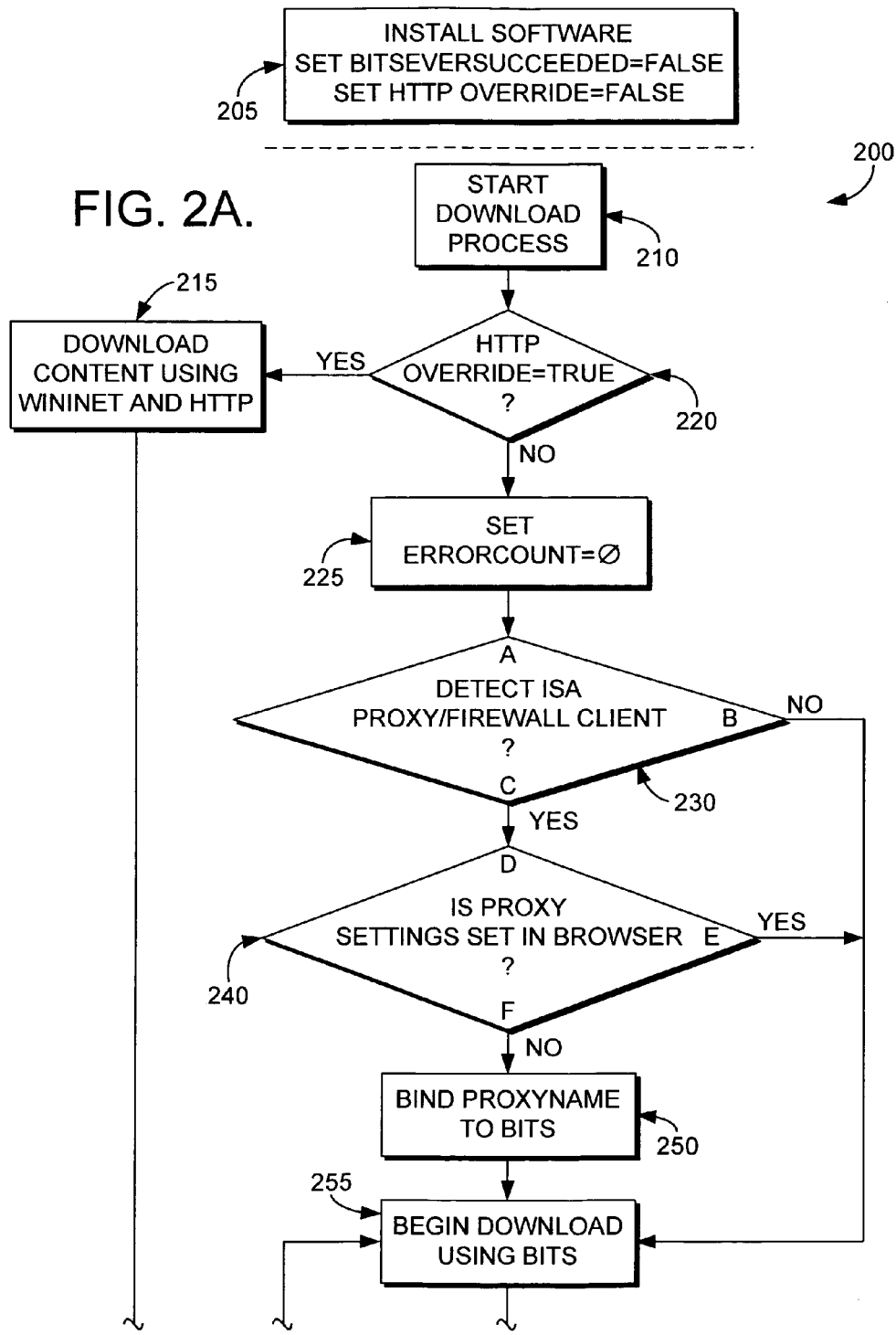
FIGS. 2A and 2B are flowcharts illustrating an exemplary process for downloading content from the internet in accordance with an embodiment of the present invention.
Figure 2B:
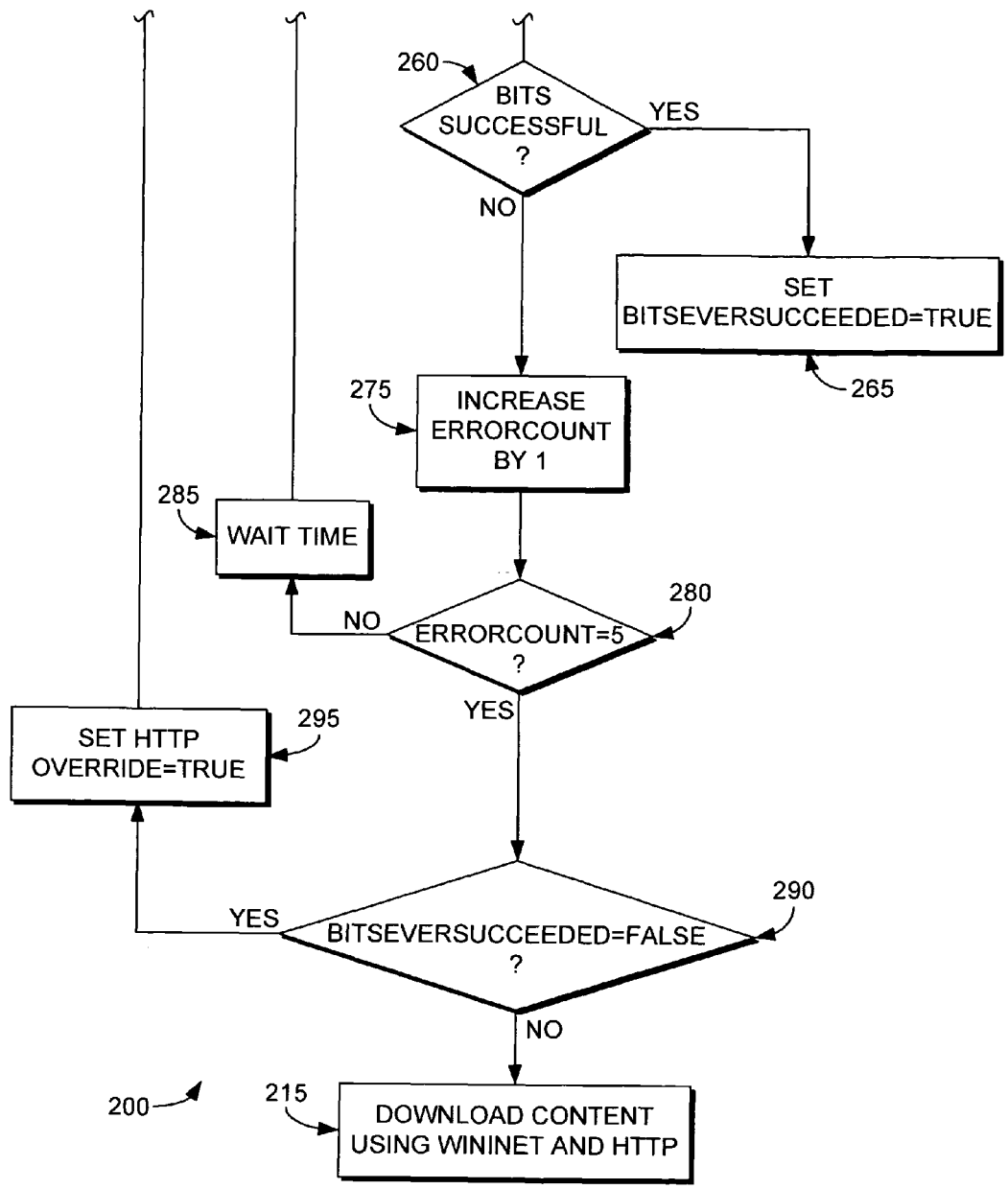

Now referring to FIGS. 2A and 2B, a flowchart is shown illustrating an exemplary process for practicing an embodiment of the present invention. Download process 200 operates by providing a backup mechanism to download content in case the primary mechanism fails to perform the download. Download process 200 also provides a solution to perform downloads when a firewall exists in the network such as internet 510 or when internet accelerator 565 is used.

In an embodiment of the present invention, BITS may be found operating in the WINDOWS® Operating System. BITS is a WINDOWS® Operation System infrastructure that provides a set of application program interfaces to request file transfers over HTTP. BITS provides a management system for all requests submitted by multiple applications operating in the computing environment, and processes one request at a time until completion. BITS transfers files of data on behalf of applications in a throttled fashion. Throttling the transfers means that BITS only uses leftover or unused bandwidth to transfer data.

The desirability of BITS originates from the use of leftover or unused bandwidth. For example, before the availability of BITS, the IT administrator would have to be concerned that downloads initiated by the users operating in the network might interfere with the network operations for such activities as network monitoring, software deployments, and operation, especially in a corporate environment where the IT administrator is responsible for the continuous operations of the corporate entity's network. The IT administrator might be inclined to limit network access to users in the environment if such access would adversely impact network operations. A user making a request to download an unusually large file would consume an enormous amount of network bandwidth. Rather than having to compete with users in a network environment, IT administrators may restrict or prohibit user access to certain content in the internet. BITS provides a solution for both the IT administrator and user in the network. BITS allows the IT administrator to maintain control over the network while allowing user access to content over the internet as depicted by FIG. 5. The IT administrator can set priorities to various users for downloads without interfering with critical operations such as installing security patches, hot fixes, etc.

BITS operates by using unused network bandwidth. It operates by using four priority queues to perform data transfers: foreground, background high, background medium, and background low. Each priority queue is processed completely before any jobs at a lower priority are processed. However, the IT administrator may have wide discretion in altering how jobs are processed as well as how jobs are assigned to each priority queue.

In FIG. 2A in a step 205, computer software is installed on a computing device to manage and operate a download manager. During this installation phase in step 205, several items within the computer software are configured. A variable, BitsEverSucceeded, is set to false and a variable, HTTP Override, is set to false. Both variables may have their respective values changed between true and false depending on the state of the computer program as it operates an embodiment of the present invention.

In a step 210, the download process begins. At this step, a user at user 525 or computer 560 has requested to download content indicated by content 570 through a connection to the internet depicted by internet 510. A determination of whether HTTP Override is set to true or false is made at a step 220. If HTTP Override is set to true in step 220, content 570 will be downloaded to user 525 or computer 560 using WININET and HTTP as indicated in a step 215. As will be discussed below, WININET and HTTP may be used together as a backup download program when BITS fails to perform. WININET and HTTP may be used to perform transfers of data especially for the downloading of files.

WININET is an application programming interface found in the WINDOWS® Operating System. It is used to enable applications to interact with Gopher, FTP, and HTTP protocols to access internet resources. Gopher is an internet protocol that is used for distributed document search and retrieval. FTP is the acronym for the file transfer protocol. As indicated by the name, this protocol transfers files between computing devices. HTTP is the well-known acronym for the hypertext transfer protocol. It is an application-level protocol that is widely used in the computing environment, especially when dealing with the internet. One additional protocol that may be used with WININET but not listed with the group above is SIP. SIP is the acronym for session-initiated protocol.

Going back to FIG. 2A, in step 220, if HTTP override is set to false then the decision will be no. A variable, ERRORCOUNT, will be set to zero in a step 225. In a step 230, a decision may be made whether an ISA Proxy/Firewall Client is detected. The ISA Proxy/Firewall Client is a set of computer software that operates in a computing device, such as user 525. It is normally found in computing environments such as corporate environment 520, but it may also be found in computer 560 in some residential users, such as residential environment 550. The acronym ISA stands for Internet Security and Acceleration. The details of the ISA Proxy Client or ISA Firewall Client will not be discussed here as there are numerous documentation and literature in the public domain discussing the details of the ISA Proxy/Firewall Client. The ISA Proxy/Firewall Client may be procured from various commercial suppliers and be installed on the computing device. In the present invention, the goal is to determine whether the ISA Proxy/Firewall Client is detected on the computing device, such as user 525. The details of step 230 are shown in an expanded view in FIG. 3.

Figure 3:
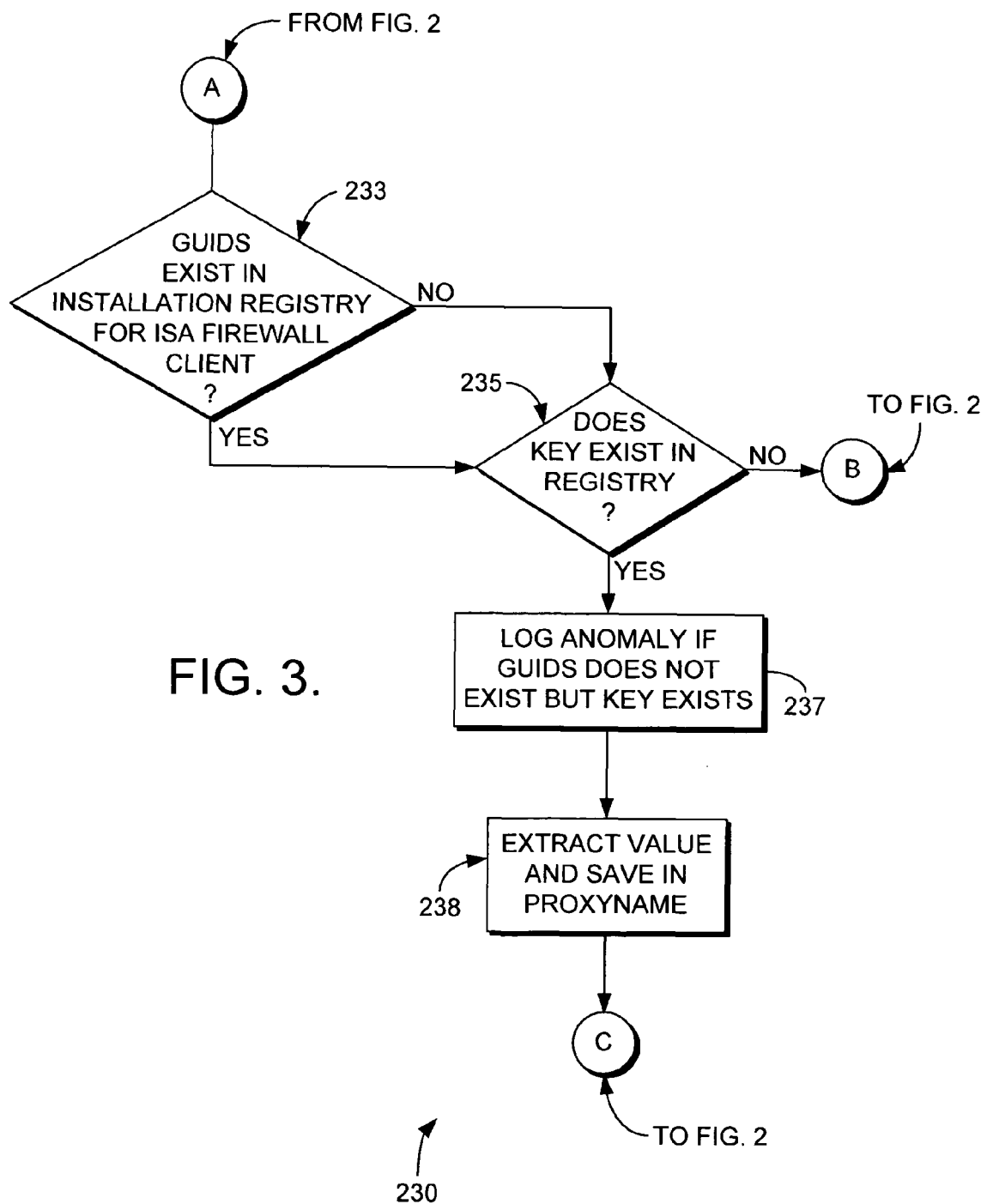
FIG. 3 is a flowchart illustrating an exemplary process for detecting a proxy/firewall client in accordance with an embodiment of the present invention.

In FIG. 3, steps 233, 235, 237, and 238 illustrate the decision process to determine if the ISA Proxy/Firewall Client is detected on the computing device. At a step 233, an installation registry in the WINDOWS® Operating System is checked for the existence of globally unique identifiers (GUIDS) associated with the ISA Proxy/Firewall Client. GUIDS are found in the installation registry and convey information about activities that have occurred in the computing device, such as user 525. The presence of GUIDS associated with the ISA Proxy/Firewall Client may indicate that the ISA Proxy/Firewall Client has been installed on the computing device. Next, at a step 235, a WINDOWS® Operating System registry is checked to determine if a key exists associated with the firewall client. The WINDOWS® Operating System registry includes a database that operates to store profiles for users of the computing device, information about hardware in the computing device, installed programs, and property settings. If the key does not exist, the process returns to FIG. 2 with the decision of no noted in step 230, and the process proceeds to a step 255. If the key does exist, the process proceeds to a step 237 to log anomalies about the computing device's operating environment if the GUIDS do not exist but a key was found in the registry. In some cases, it is possible to install the firewall client without registering the software with the system's installer. This happens in the case of image/rebuilds performed by some IT administrators. Therefore, it would lead to the situation just discussed above. The information is logged for future consideration when trouble shooting the computing device to determine that the computing device is in a non-optimal state.

Regardless of the conditions expressed above, if the key is found in the registry in step 235, a value is extracted and saved into a variable, proxyname, in a step 238. Normally, the key may be located at "HKLM\Softare\Microsoft\Firewall Client\Configuration Location" in the registry. However, the location may change depending on computer software changes. Once the variable proxyname is determined, the process proceeds back to FIG. 2 with a determination of yes at step 230.

Figure 4:
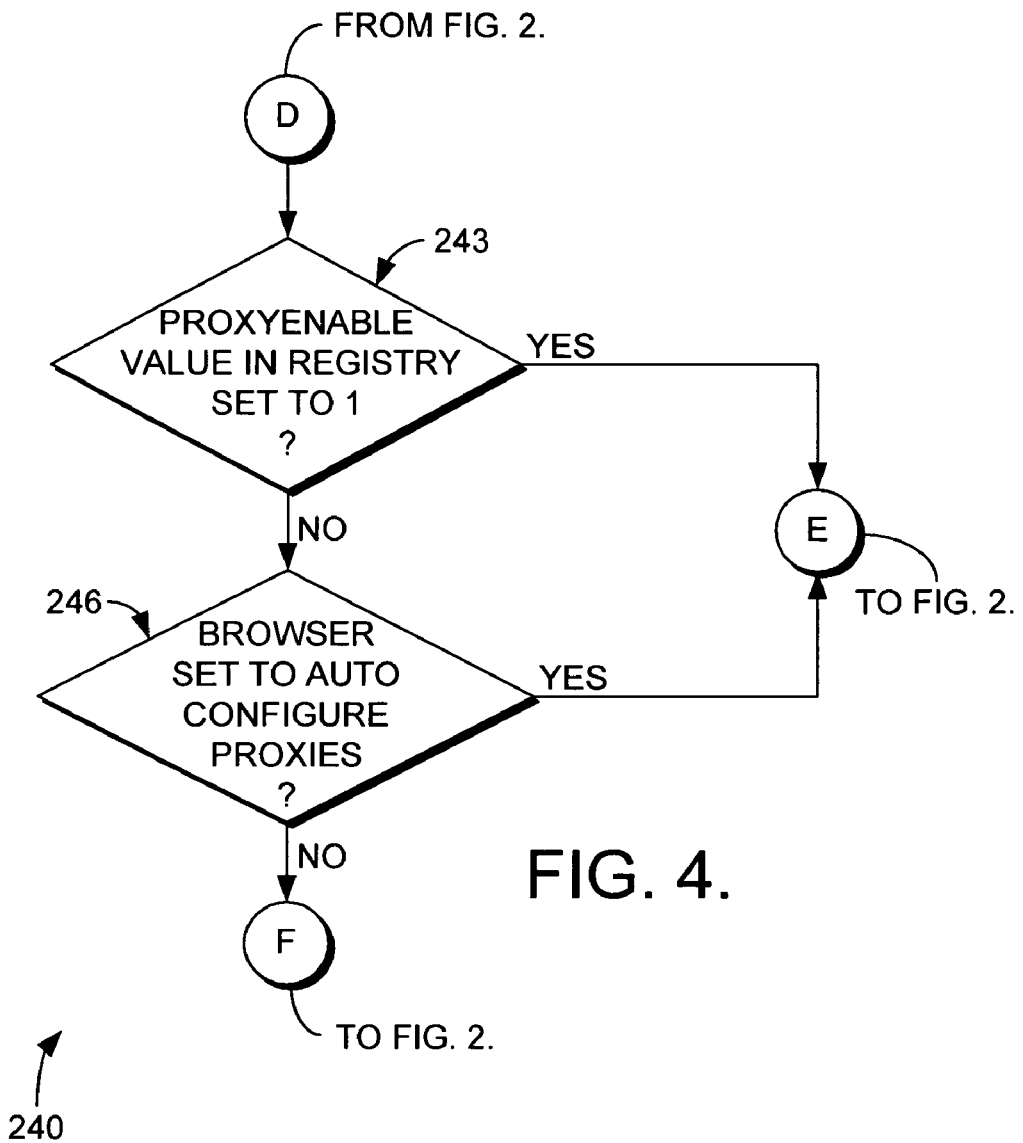
FIG. 4 is a flowchart illustrating an exemplary process for detecting proxy settings in accordance with an embodiment of the present invention.

At a step 240, the web browser is checked for the existence of proxy settings. FIG. 4 provides an expanded view of step 240 for the decision process. In FIG. 4, a step 243 and a step 246 are shown. Step 243 determines if a value proxyenable is set to 1. If it is set to 1, the process proceeds back to FIG. 2 with a determination of yes at step 240. If the value proxyenable is not set to 1, the decision is set to no. Step 243 may be used to determine when a user has explicitly set proxies in their web browser.

At step 246, if the decision of step 243 is no, a determination is made whether the web browser is set to auto configure proxies. If the answer is yes, the process proceeds back to FIG. 2 with a determination of yes at step 240. If the answer is no, the decision is set to no and the process proceeds back to FIG. 2 with a determination of no at step 240. Therefore, in FIG. 4, if either decision point yields a yes (i.e the user sets a proxy or the web browser is set to auto configure proxies), BITS may be used to download content 570 in step 255. However, if both decision points yield a no, the computer software binds the variable proxyname to BITS. One may understand that from the aforementioned discussion, BITS may not operate properly if a proxy is not found for user 525. This happens in environments where internet access is protected with a proxy service (i.e. firewall). Although not discussed earlier, the same is true for computer 560 if it contains a locally installed proxy service (i.e. proxy/firewall client).

At a step 250, the computer software operating on user 525 or computer 560 binds the variable, proxyname, to BITS if a proxy/firewall client is detected in step 230 but no proxy settings are found in the web browser in step 240. In step 240, the decision of yes indicates that proxy setting are explicitly set in the web browser. Proxy information will be bound to all BITS jobs, and firewall 540 will handle information correctly, enabling BITS to operate.

At a step 260, the decision is determined whether BITS completed successfully. If successful, the variable BitsEverSucceeded is set to true. The information lets the computer program know that BITS has run successfully on the particular computing device, mainly user 525 and computer 560. Remember, the computer program sets the variables BitsEverSucceeded and HTTP Override during install but does not re-initialize the variables. Therefore, the status of the variables may be maintained for successive operations of the present invention.

If BITS is unsuccessful at step 260, the variable, ERRORCOUNT, may be increased by 1 to track a number of executions for BITS. The computer program tries to execute BITS again. At a step 285, a waiting period may be established before the computer program tries again. The waiting period may vary on each subsequent attempt in order to give the computer program more time to execute properly. However, only five attempts are built into the embodiment of the present invention. The number of attempts that the embodiment tries to achieve is merely exemplary and may change with other implementations of the present invention. In this embodiment, five attempts are made as shown in a step 280. Upon the fifth attempt, a determination is made whether BitsEverSucceeded is set to false at a step 290. If the answer is yes, the computer program indicates that BITS has never run successfully. The computer program may set the variable, HTTP Override, to true at a step 295, and use a backup download manager at a step 215. The computer program on future download or upload attempts will use the backup download manager and never use BITS again unless a new installation occurs. One may note that the new installation may occur upon the initialization sequence to turn on user 525 or computer 560, or the new installation may occur by re-initializing the computer software while operating user 525 or computer 560. With either result, the variables, BitsEverSucceeded and HTTP Override, may be reset allowing for the computing devices to attempt to use BITS again.

Going back to step 290, if the answer is no that BitsEverSucceeded is set to false, then the backup download manager attempts to download content at step 215. One may note that the variable, HTTP Override, is not changed if BitsEverSucceeded equals true. This means that for future download or upload attempts, the computer program may try to use BITS again as a first choice without attempting to use the backup download manager as a first choice.

Going through FIGS. 2A and 2B, one may note that the embodiment of the present invention may work for a computing device that has installed the internet accelerator as discussed for computer 565. In many cases, no proxy/firewall client may be detected in step 230. An attempt to use BITS as the download manager may be done at step 255. Even if the proxy/firewall client is installed at step 230, there may or may not be proxy settings enabled at step 240. The point here is to show that regardless of the proxy information, BITS may not operate properly due to the internet accelerator. Remember, BITS may not operate successfully because the content size may have been stripped away by the internet accelerator. So, if BITS is not successful as determined in step 260, the computer program proceeds to the steps 275, 280, 285, and 290 to get to step 215 whereby the backup download manager executes using WININET and HTTP.

Although an embodiment has been discussed for the present invention, there may be other download managers similar to BITS that may be implemented to operate with the present invention. The prior discussion is only for illustrative purposes to convey an exemplary embodiment. Other embodiments may be employed to accomplish the same tasks. In addition, the steps discussed in FIGS. 2A, 2B, 3, and 4, may be executed without regards to order. Some steps may omitted and some steps may be executed at a different time than shown. The point here is to convey that the figures are merely exemplary for the embodiment of the present invention and that other embodiments may be implemented for the present invention.

The invention claimed is:

1. A computer-implemented method for transferring a content in a network, comprising: detecting an internet accelerator operating on a user computing device, wherein a detection of the internet accelerator is determined from at least one of a first presence of compressed content, a second presence of reduced-size content, and a lack of presence of a content size in the content, and wherein the internet accelerator disrupts an operation of a background intelligent transfer service; operating the background intelligent transfer service to transfer the content between the user computing device and other computing devices wherein the background intelligent transfer service uses unused network bandwidth to transfer the content, wherein the background intelligent transfer service manages requests to transfer data submitted by applications and processes each request; operating the background intelligent transfer service to assign requests to priority queues, wherein each request with a higher priority is processed before requests with a lower priority; and upon a failure of the background intelligent transfer service during the transfer of the content, selecting an application program interface and an application-level protocol to transfer the content between the user computing device and the other computing devices, wherein the application program interface enables applications to interact with Gopher, FTP, and HTTP protocols.

2. The computer-implemented method of claim 1, wherein operating the background intelligent transfer service to transfer the content comprises at least one of downloading the content from the internet, uploading the content to the internet, and uploading the content to the internet and receiving a reply.

3. The computer-implemented method of claim 2, wherein the content is selected from the group comprising information contained in files, and streams of data.

4. The computer-implemented method of claim 3, wherein the background intelligent transfer service comprises a set of application program interfaces in a windows-based operating system infrastructure to request file transfers over HTTP.

5. The computer-implemented method of claim 4, wherein the application-level protocol is selected from the group comprising HTTP, FTP, and Gopher.

6. A computer system having a processor, a memory and an operating environment, the computer system operable to execute the method as recited in claim 1.

7. A computer-readable storage medium having instructions stored thereon for performing the method of claim 1.

8. A computer-implemented method for managing downloads from the internet, comprising: detecting a dial-up internet accelerator operating on a user computing device, wherein a detection of the dial-up internet accelerator is determined from at least one of a first presence of compressed content, a second presence of reduced-size content, and a lack of presence of a content size in a content, and wherein the internet accelerator disrupts an operation of a background intelligent transfer service; executing an HTTP GET request that is part of the background intelligent transfer service, further comprising determining if the HTTP GET request is successful wherein the background intelligent transfer service uses unused network bandwidth, wherein the background intelligent transfer service manages requests to transfer data submitted by applications and processes each request; and if the HTTP GET request is unsuccessful, executing an application program interface and an application-level protocol to download the content from the internet, the execution of the application program interface and the application-level protocol bypass using the background intelligent transfer service.

9. The computer-implemented method of claim 8, wherein the content is selected from the group comprising information contained in files, and streams of data.

10. The computer-implemented method of claim 9, wherein the background intelligent transfer service comprises a set of application program interfaces in the WINDOWS® Operating System infrastructure to request file transfers over HTTP.

11. The computer-implemented method of claim 10, wherein the application-level protocol is selected from the group comprising HTTP, FTP, and Gopher.

12. A computer-readable storage medium having instructions stored thereon for performing the method of claim 8.

* * * * *